United States Patent [19]

Vogel et al.

[11] 3,728,728
[45] Apr. 17, 1973

[54] METHOD AND APPARATUS FOR AUTOMATIC TRANSPONDER DELAY CORRECTION

[75] Inventors: Horst Vogel, Kornwestheim; Herbert Kleiber, Ludwigsburg, both of Germany

[73] Assignee: International Standard Electric Corporation, New York, N.Y.

[22] Filed: June 5, 1970

[21] Appl. No.: 43,873

[30] Foreign Application Priority Data

June 7, 1969 Germany..................P 19 29 042.7

[52] U.S. Cl..................343/17.7, 343/6.5 R, 343/7.5
[51] Int. Cl..................................................G01s 7/40
[58] Field of Search..................343/17.7, 7.5, 6.5 R

[56] References Cited

UNITED STATES PATENTS 3,302,199  1/1967  Kelly et al. .............................343/7.3
3,242,489  3/1966  Leyde.....................................343/7.3
3,323,123  5/1967  Hegarty et al. ......................343/17.7
3,427,615  2/1969  Hubka...................................343/14

Primary Examiner—Benjamin A. Borchelt
Assistant Examiner—G. E. Montone
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A method and apparatus is provided for determining the varying delays in a pulse interrogation system wherein a reply pulse is transmitted after a predetermined time following reception of an interrogation pulse. Transmitter and receiver delays are measured in a ring counter with the aid of a measuring pulse taken from the transmitter. This measured delay is subtracted from the predetermined time between the next pulse received and the following transmitted pulse thereby providing automatic transponder delay correction.

9 Claims, 1 Drawing Figure

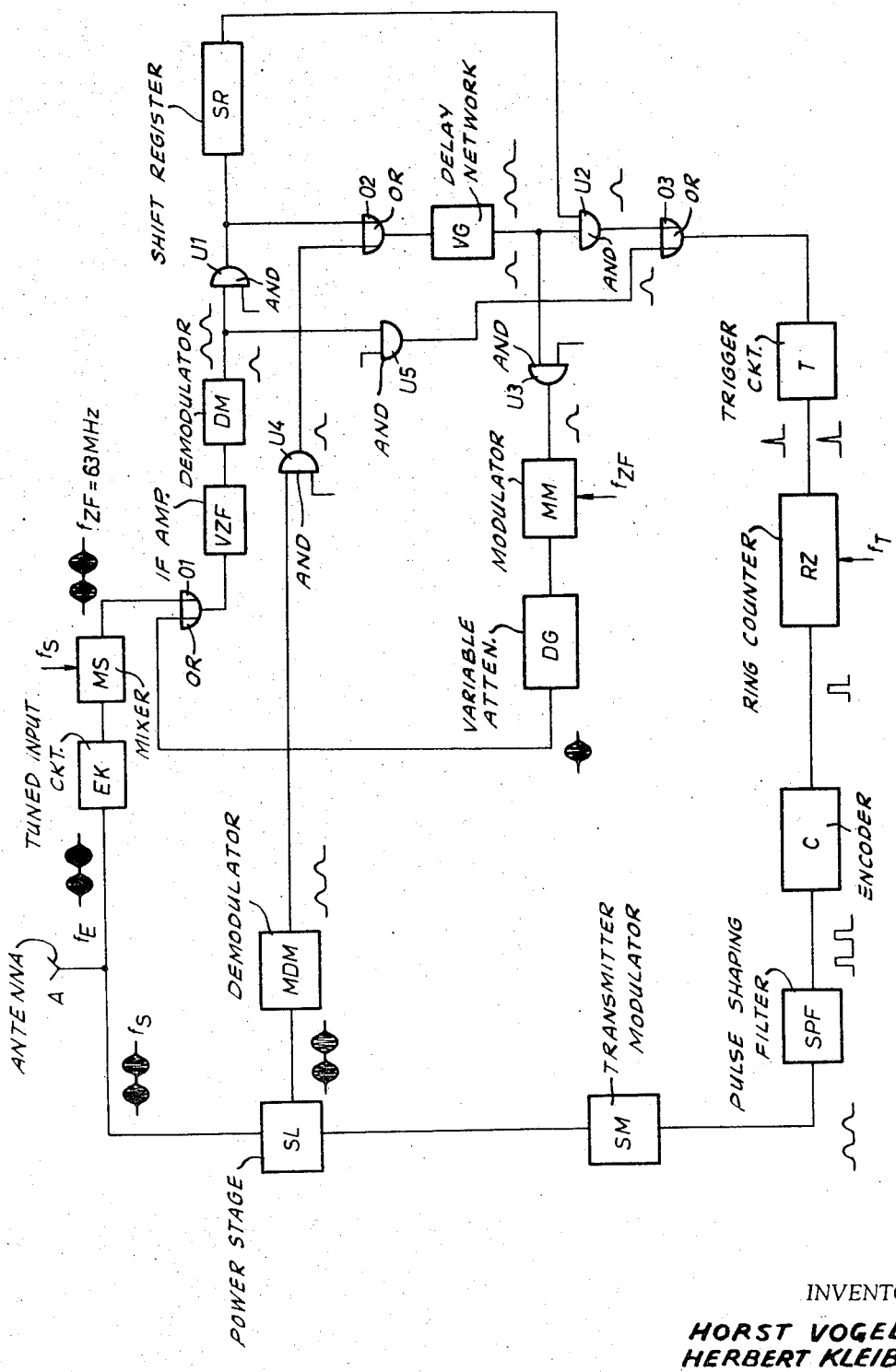

METHOD AND APPARATUS FOR AUTOMATIC TRANSPONDER DELAY CORRECTION

BACKGROUND OF THE INVENTION

The invention relates to a method of determining the varying equipment delays in receivers and transmitters for pulse interrogation methods wherein a transmitting pulse is sent out from the ground station after a predetermined time following reception of a pulse, the receiver being switched off during transmission, particularly for use in precision distance measuring in radio navigation.

The method will be described by way of example of the Tacan-method. It is, however, not limited thereto but may be generally used with all interrogation methods.

As is well known, Tacan is a polar-coordinate method used in short-range navigation, which employs transponders at the ground and on board aircraft. Pulses of a certain frequency are sent out from the aircraft, picked up by the ground station and answered on another frequency after a predetermined time. The time delay of the pulses from the airborne transmitter to ground receiver to ground transmitter to airborne receiver is the measure of the distance of the aircraft from the ground station. In this case, it is necessary for obvious reasons that the predetermined time between the arrival of the interrogation pulse and the transmission of the response pulse is met precisely.

As is well known, the interrogation and response pulses consist of double pulses of a certain width and a certain spacing, which are recognized with the aid of a decoder circuit. This decoder circuit as well as other stages of the transmitter and the receiver have certain delays which must be taken into account if the predetermined time between interrogation and response is to be satisfied.

In the known Tacan equipment, the delay from the receiver input to the input of a ring-counter which measures the predetermined time is once measured at a given temperature, e.g., room temperature, before commencement of operation. The counter is preset to this measured value.

This arrangement has the disadvantage that in each case, a constant time in the test loop is allowed for irrespective of temperature-dependent changes and aging symptoms of the components. Therefore, precision distance measurements can only with difficulty be carried out when using the known arrangements.

SUMMARY OF THE INVENTION

It is the object of the present invention to provide a method which avoids these disadvantages by automatically determining and taking into account the equipment delays for each interrogation-response-pulse train. It requires no change in the basic design concept because it still enables the receiver to be switched off during transmission.

According to a broader aspect of the invention there is provided an improved method of determining the varying delays in the receiver and transmitter of a pulse interrogation system of the type wherein a pulse is transmitted from a ground station after a predetermined time following the reception of a pulse, and wherein the receiver is switched off during transmission, particularly for use in precision distance measuring in radio navigation, wherein the improvement comprises: measuring the delay in the transmitter stages, generating a measuring pulse at the transmitter at the start of transmission, measuring the delay in the receiver stage, and subtracting from the predetermined time between the next received pulse and the following transmitted pulse, the sum of the transmitter and receiver delays.

This method, which is given for the ground station, may be analogously applied to airborne stations, in which case the ring counter is replaced by a distance measurer.

According to a particularly advantageous feature of the method the measuring pulse passes through the receiver in reverse order (decoder circuit before IF section) as compared with the actual receiving pulse. This enables the receiver to be switched-off during transmission.

This and other features of the invention will be better understood from the following detailed description taken in conjunction with the accompanying drawing, in which:

BRIEF DESCRIPTION OF THE DRAWING

The drawing shows a block diagram of the well known ground station of a Tacan system, extended by means of the invention.

DESCRIPTION OF THE PREFERRED EMBODIMENTS

The ground station receives and transmits double pulses with a duration of $3.5\mu s$ and a spacing of $12\mu s$ via antenna A. The receiving and transmitting frequencies are of the order of 1,000 MHz and have a frequency spacing of 63 MHz. In the drawing, the receiving pulses are shown above on the right side of the lines, and the transmitting pulses below on the left side of the lines, respectively.

Via the antenna A and a tuned input circuit EK, an incoming (interrogation) double pulse arrives at a mixer MS whose oscillator is tuned to the transmitting frequency $fs$. The resulting intermediate frequency fZF (63 MHz) is applied to an intermediate-frequency amplifier VZF and a demodulator DM via an analog OR-circuit O1. The demodulator DM supplies the double pulse as a video frequency. Via an AND-circuit U1, the double pulse is applied to a decoder circuit essentially consisting of a shift register SR, a delay network VG and an AND-circuit U2. A ring counter RZ is started via a trigger circuit T when a double pulse has been unambiguously recognized. The clock frequency $fT$ of the ring counter is 80 MHz. With a constantly switched-on clock, the ring counter would pass through its zero position every $50\mu s$. This is the predetermined time between interrogation and response pulse.

The ring counter moves from a preset value, whose origin will be explained hereinafter, over its zero position and releases in an encoder C the transmitting double pulse-pair which is applied to a transmitting modulator SM via a pulse shaping filter SPF. The power stage M belonging thereto is designated SL. During transmission, the receiver is switched off.

A measuring double pulse is coupled from the transmitter power stage SL, which is demodulated in a demodulator MDM. The second pulse of the demodulated measuring double pulse is suppressed with the aid of an AND-circuit U4. Via an OR-circuit O2 the first pulse is applied to the delay network VG of the decoder whose delay is approximately 33µs. The AND-circuit U2 prevents the measuring pulse at the output of the delay network VG from reaching the ring counter. At this moment, the second input of an AND-circuit U3 is selected instead, so that the measuring pulse is applied to a modulator stage MM whose oscillator frequency is the intermediate frequency $fZF$. The resulting IF measuring pulse, which differs from the IF receiving signal only in the amplitude, is applied to a variable attenuator DG. By means of this attenuator, the amplitude of the IF measuring pulse may be adjusted to the amplitude of the IF receiving pulse in order to ensure that the IF measuring pulse in the IF amplifier is delayed by the same time as the preceding receiving double pulse. The attenuator DG may be controlled by the control voltage for the IF stages. Via the OR-circuit O1, the IF measuring pulse is applied to the IF-amplifier VZF and the demodulator DM. With the arrival of the measuring pulse at the demodulator output, an AND-circuit U5 and the AND-circuit U1 are controlled so that the measuring pulse is applied directly via an OR-circuit O3 to the trigger T. This trigger causes the counting run of the ring counter RZ to be interrupted. The time between the zero passage of the counter and the counter stop represents the internal equipment delay of the transmitter and the greater part of the receiver, which delay is allowed for with the next interrogation pulse.

Finally it should be mentioned that the delays of the demodulator MDM, the modulator stage MM, the variable attenuator DG, the input circuit EK, and the mixer MS as well as those of the analog AND-circuits are negligible.

We claim:

1. An improved method of determining the varying delays in the receiver and transmitter of a pulse interrogation system of the type wherein a pulse is transmitted from a ground station after a predetermined time following the reception of a pulse, and wherein the receiver is switched off during transmission, particularly for use in precision distance measuring in radio navigation, wherein the improvement comprises:
    measuring the delay in the transmitter stages;
        generating a measuring pulse at the transmitter at the start of transmission;
    measuring the delay in the receiver stage; and
    subtracting from the predetermined time between the next received pulse and the following transmitted pulse, the sum of the transmitter and receiver delays.

2. A method according to claim 1, wherein generating said measuring pulse includes coupling out a part of the transmitting energy as a measuring pulse.

3. A method according to claim 2, wherein measuring the delay in the receiver stage includes the steps of:
    passing said measuring pulse through at least part of the receiver stage;
    generating a trigger pulse from said measuring pulse; and
    stopping a ring counter with said trigger pulse, said ring counter defining said predetermined time by releasing a transmitting pulse at each zero passage.

4. A method according to claim 3, wherein the step of subtracting includes triggering said ring counter to count from the preset value upon reception of the next pulse.

5. A device for improving the distance measurement accuracy of a radio navigation system which includes fixed and mobile transmitter-receiver arrangements and in which distance measurement is effected as a function of measured time delay between a coded interrogation pulse group comprising at least one pulse, transmitted from said mobile transmitter, and reception by said mobile receiver of a reply pulse group from said fixed transmitter, comprising:
    first means within said fixed transmitter-receiver arrangement to initiate said transmitted reply pulse group after a predetermined time delay from reception of said interrogation pulse group at said fixed receiver;
    second means within said fixed transmitter-receiver for developing a measuring pulse substantially at the time of occurrence of each of said transmitted reply pulse groups;
    and control means for directing said measuring pulse through at least a portion of the circuits of said fixed receiver and thereafter to said first means at a time when operation of said fixed receiver is not required for receiving interrogation pulses, in a manner to control said predetermined time delay to a calibration value.

6. Apparatus according to claim 5 in which said measuring pulses are derived from a portion of the energy of said transmitted reply pulses, said receiver includes a mixer, an intermediate frequency amplifier and decoder circuits for unambiguously recognizing said coded interrogation pulse groups including means to produce corresponding output triggers, and said logic control means are adapted to direct said measuring pulse first through said decoder circuits, next through said intermediate frequency amplifier, and then through said output trigger means to said first means.

7. Apparatus according to claim 6 in which said first means includes third means comprising a clock-driven, counting, delay-determining device responsive to said output trigger corresponding to said measuring pulse to terminate its count, said third means thereby assuming a delay value automatically applied from reception of the next interrogation pulse group to apply said predetermined time delay to generation of the corresponding reply pulse group by said fixed transmitter.

8. Apparatus according to claim 7 in which said third means comprises a ring counter adapted to count under the control of a clock pulse train and to terminate said count at the time of application of said measuring pulse, and to provide a transmitter trigger after completion of the count in response to the next interrogation pulse group through said fixed receiver, thereby to provide implicit subtraction of the delays of the loop including said fixed transmitter and receiver from the predetermined time between the next following received interrogation pulse group and the correspondingly generated fixed transmitter reply.

9. Apparatus according to claim 6 including a modulator connected to convert said measuring pulse to the IF domain before it is passed through said intermediate frequency amplifier.

* * * * *